March 30, 1926.
S. WESTON
1,578,786
SPIRIT LEVEL
Filed August 20, 1923
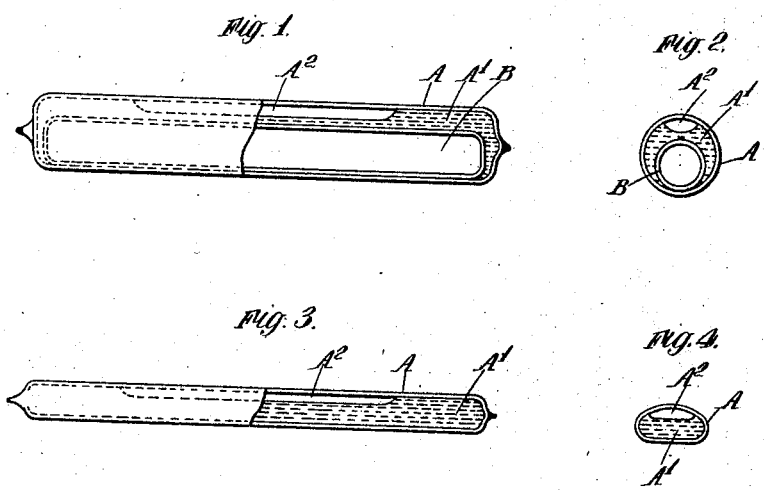
Inventor
Samuel Weston
By Cushman, Rycroft Darby
Attys Patented Mar. 30, 1926.

1,578,786

UNITED STATES PATENT OFFICE.

SAMUEL WESTON, OF LONDON, ENGLAND, ASSIGNOR TO E. R. WATTS & SON, LIMITED, OF LONDON, ENGLAND.

SPIRIT LEVEL.

Application filed August 20, 1923. Serial No. 658,322.

*To all whom it may concern:*

Be it known that I, SAMUEL WESTON, a subject of the King of Great Britain, residing at 123 Camberwell Road, in the county of London, England, have invented certain new and useful Improvements in or Relating to Spirit Levels, of which the following is a specification.

This invention relates to spirit levels having an air, gas or vapour bubble. In such levels it is found that the length of the bubble alters at different atmospheric temperatures owing to variations in the volume of the bubble as a result of increase or decrease of the volume of the liquid. With large temperature variations the alterations in the length of the bubble are so pronounced as to cause difficulty in obtaining accurate readings.

According to the present invention provision is made whereby the length of the air bubble will remain approximately constant despite temperature variations, by so forming the interior of the liquid chamber that when, as a result of variations of temperature, the volume of air (or of the gas or vapour) is altered, this alteration operates to vary the cross-sectional area of the bubble in such a manner as to maintain its length constant or approximately so. Apparently rise of temperature leads to two separate but simultaneously occurring effects, viz (1) expansion of the liquid and consequent diminution in the volume of the bubble both in respect to length and cross-sectional area, and (2) decrease of surface tension resulting in decrease of the cross-sectional area of the bubble and increase in its length owing to the fact that the bubble is situated under a curved surface having a relatively small radius of transverse curvature, the volume remaining substantially constant so far as this consideration alone is concerned. The amount of diminution in the volume of the bubble due to expansion of the liquid for a given rise in temperature will obviously depend upon the proportion existing between the volume of liquid and the volume of air (or of gas or vapour) the diminution increasing as the proportion of liquid to air increases. By suitably arranging this proportion, a condition of affairs is obtained in which the decrease in the length of the bubble due to the diminution in volume of the air as a result of expansion of the liquid is nullified by the increase in length due to the decrease in surface tension, the result therefore being that the bubble is maintained approximately constant in length (although of variable cross-section) during temperature variations. I have found that in order to obtain this constant length of bubble when the liquid employed is spirit the volume of spirit and the volume of air (measured at normal atmospheric temperature of about 60° Fahrenheit) should be in the proportion of approximately seven parts of spirit to three of air. More specifically I have found that accurate results are obtained with 71% of spirit (such as petroleum ether) to 29% of air, but this proportion may obviously be departed from within limits if complete accuracy is not desired and moreover the proportion will differ somewhat with different kinds of spirit. If spirit and air in the above mentioned proportion are employed, a constant length of bubble can be obtained in a level having a circular bore or chamber, provided the level be made sufficiently long (about 24 inches for example) and of sufficiently small bore (about half an inch for example) to give an air bubble of smaller length than the length of the level, but in order to reduce the length of the level so as to conform to the practical requirements for surveying and other instruments, I may suitably modify the effective cross-sectional shape of the bore or chamber of the level.

In order that the said invention may be clearly understood and readily carried into effect, the same will now be described more fully with reference to the accompanying drawings, in which:—

Figure 1 is a sectional side elevation showing one form of level in accordance with my invention.

Figure 2 is a cross-section of Figure 1.

Figures 3 and 4 are views similar to Figures 1 and 2 showing another form of level, and A is the body of the level, A' the liquid therein and A² the air bubble.

Referring to Figures 1 and 2, the level A is made of circular cross-section and the required proportion between the volume of liquid and air is obtained by the insertion of a sealed tube B (preferably made of glass) in the level A. This sealed tube might, if desired, be replaced by a rod of corresponding size also preferably made of glass. The said sealed tube or rod may be only slightly shorter than the level and is preferably unattached to the latter, while its weight is such that it sinks in the liquid and rests at the bottom of the level. The relative cross-sectional dimensions of the level and the said sealed tube or rod are such that there is a shallow body or waist of liquid between the lower part of the bubble and the upper part of the sealed tube or rod as shown in Figure 2.

In the construction shown by Figures 3 and 4 the sealed tube or rod of Figures 1 and 2 is dispensed with by making the level of the cross-sectional shape shown in Figure 4. From this figure it will be seen that the lower wall of the level is flat, the upper wall is of slightly curved formation (i. e. it has a curvature of large radius) while the side walls have a curvature of small radius. If desired the lower wall may be of similar curvature to the upper wall so as to give the level the form of an oval or ellipse the length of the major (i. e. horizontal) axis of which materially exceeds the length of the minor (i. e. vertical) axis. Alternatively the lower wall may be curved upwards transversely.

It should be understood that where the term "air" is used throughout the specification and claims, there is meant any gas or vapor serving to form an indicating bubble.

Furthermore, where the term "tube" is used throughout the specification and claims, without further definition of its character, is meant any form of enclosure whatsoever, the term "tube" being used merely as defining an enclosing element which constitutes a housing for the spirit and the bubble.

What I claim and desire to secure by Letters Patent of the United States is:—

1. A spirit level with the usual bubble tube having the air and liquid therein in relative proportions adapted to maintain the length of the bubble substantially constant under temperature variations.

2. A spirit level with the usual bubble tube having the air and liquid therein in relative proportions adapted to maintain the length of the bubble substantially constant under temperature variations, said tube forming a spirit chamber with its upper wall curved transversely on a relatively large radius.

3. A spirit level with the usual bubble tube having therein the air and liquid in relative proportions adapted to maintain the length of the bubble substantially constant under temperature variations, said tube forming a liquid chamber of flattened shape in cross section.

4. A spirit level with the usual bubble tube having the air and liquid therein in relative proportions adapted to maintain the length of the bubble substantially constant under temperature variations, said tube forming a spirit chamber of flattened shape in cross section and with its upper wall curved transversely on a relatively large radius.

5. A spirit level with the usual bubble tube having the liquid and air therein, when measured at normal atmospheric temperature, in the relative proportions of approximately 7 to 3, respectively.

6. A spirit level comprising the usual tube with an indicating bubble therein, said tube having the liquid and air, when measured by volume at substantially normal atmospheric temperature, in the relative proportions of approximately 7 to 3, respectively, said tube having a liquid chamber of flattened shape in cross section.

7. A spirit level with the usual bubble tube having the liquid and air therein, when measured by volume at normal atmospheric temperature, in the relative proportions of approximately 7 to 3, respectively, said tube forming a liquid chamber of flattened shape in cross section and with its upper wall curved transversely on a relatively large radius.

8. A spirit level with the usual bubble tube having the liquid and air therein, when measured at normal atmospheric temperature, in the relative proportions of approximately 7 to 3, respectively, said tube forming a spirit chamber with its upper wall curved transversely on a relatively large radius.

9. In a spirit level, an elongated tube having its upper chamber wall curved transversely on a relatively long radius, the chamber being relatively shallow in vertical planes and having its longer transverse axis in a horizontal plane.

SAMUEL WESTON.